Figure 1:
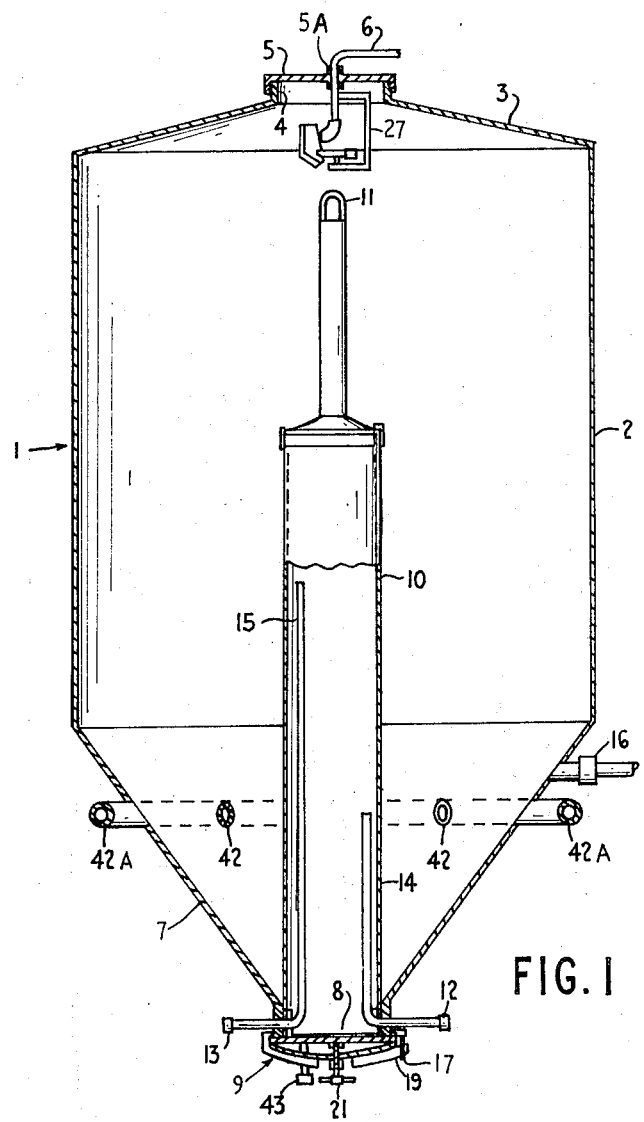

United States Patent [19]
Potter

[11] 3,823,655
[45] July 16, 1974

[54] WINE-MAKING APPARATUS

[76] Inventor: Ronald Anthony Potter, Lenehan Rd., Griffith, New South Wales, Australia 2680

[22] Filed: Oct. 26, 1972

[21] Appl. No.: 300,994

[30] Foreign Application Priority Data
Oct. 28, 1971 Australia............................ 6831/71

[52] U.S. Cl. ................................................ 99/277
[51] Int. Cl. ......................... C12c 11/04, C12g 3/00
[58] Field of Search ....... 99/276, 277, 277.1, 277.2, 99/278, 646 S, 35; 195/128, 132, 133; 426/7, 12, 13, 14, 15

[56] References Cited
UNITED STATES PATENTS
159,450 2/1875 Reford................................. 99/277

| | | | |
|---|---|---|---|
| 2,916,421 | 12/1959 | Schwaiger............................ | 99/278 |
| 3,407,722 | 10/1968 | Huppmann........................ | 99/277.1 |
| 3,729,321 | 4/1973 | Vacano............................... | 99/277.1 |

*Primary Examiner*—Robert W. Jenkins
*Attorney, Agent, or Firm*—Eric H. Waters

[57] ABSTRACT

Apparatus adapted for use in wine making, and functioning at least partly in the process of making red and white wines, and comprising a vessel including at least a sidewall, a downwardly convergent floor having an opening permitting the removal of the residual grape skins, a door normally closing the opening, means permitting the insertion of raw materials and at least one means permitting the removal of the processed grape juice.

14 Claims, 6 Drawing Figures

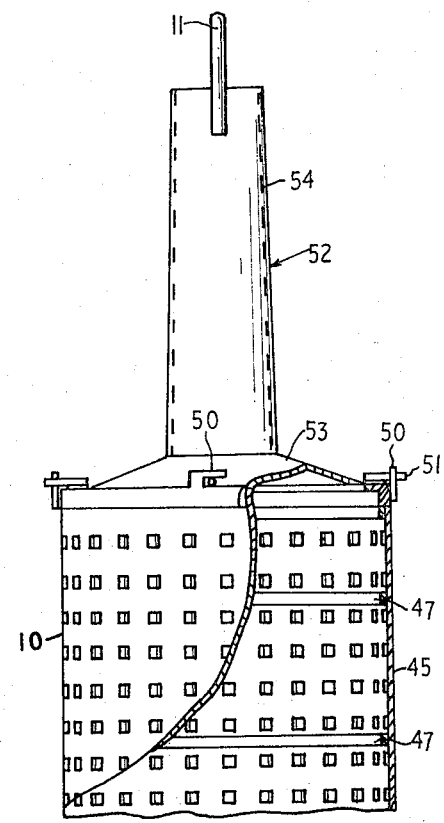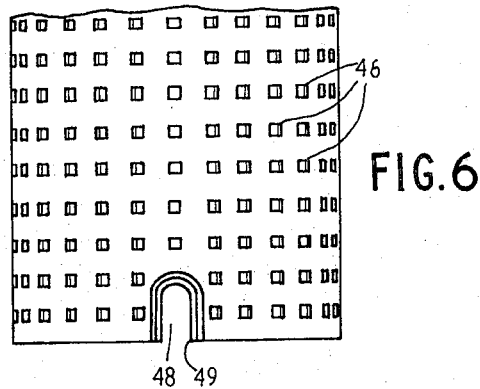
FIG.6

WINE-MAKING APPARATUS

This invention relates to improvements in and relating to wine making apparatus, more particularly to apparatus for draining white grape must and for fermenting red wines.

Present known apparatus of the type to which the present invention relates are generally deficient in that they rely upon the carbon dioxide generated by fermentation to create a pressure which forces juice up a riser tube and onto a top platform. At a predetermined level the juice is allowed to flow back into the tank proper and sprinkle the skins. This type of apparatus can only operate properly when filled to a specified level. The pressure and consequent washing of the skins is directly related to the rate of fermentation. The apparatus does not incorporate a screen whereby the juice may be drained from the skins. Furthermore, the apparatus is flat-bottomed and therefore has to be emptied manually.

An object of the present invention is to provide apparatus that is substantially free from these defects.

Another object is to provide wine making apparatus that will permit fermentation to take place at variable levels of tank capacity.

Another object is to provide apparatus for wine making that is capable of being emptied of fermented marc or drained must in a substantially more efficient manner than has previously been possible.

Another object is to provide apparatus that may be used for either the fermentation process for red wine or the draining of white must.

Another object is to provide apparatus for wine making that is substantially capable of emptying itself of fermented marc or drained must.

Figure 2:
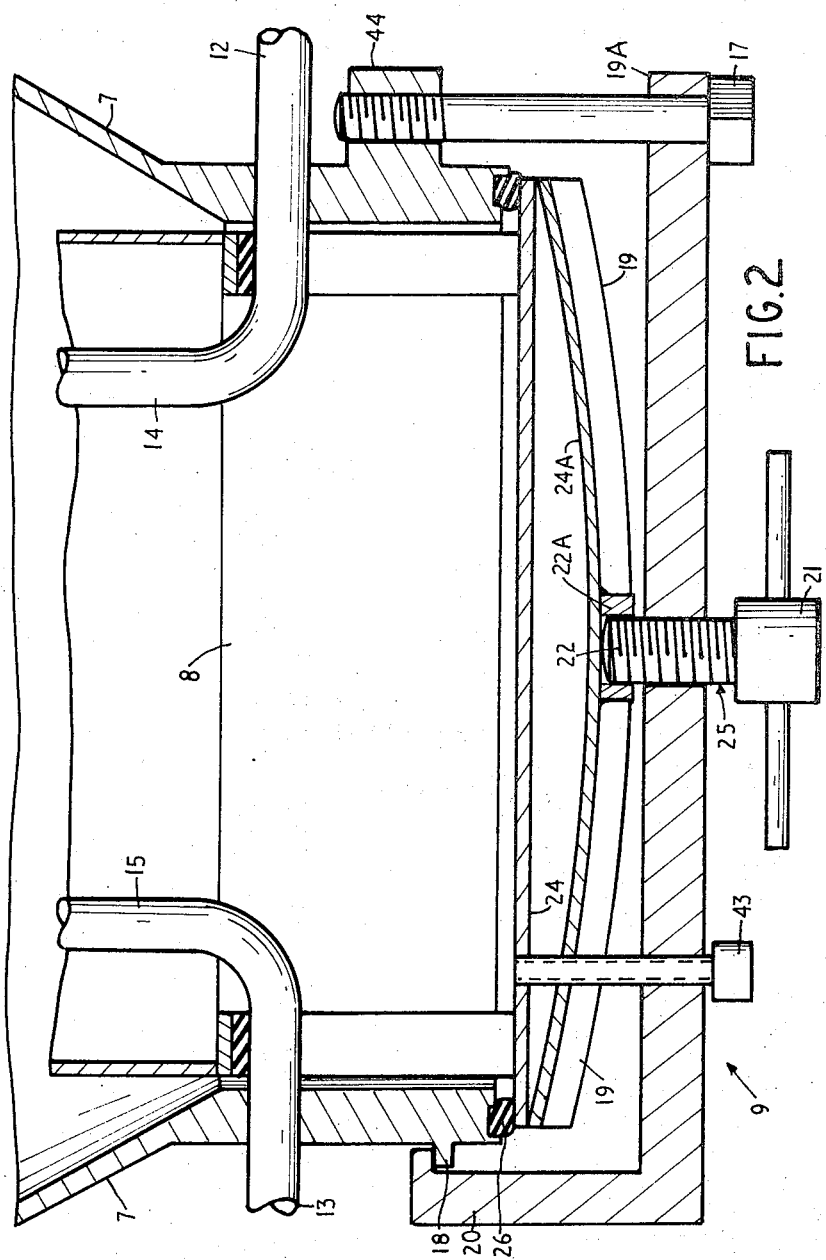
Figure 3:
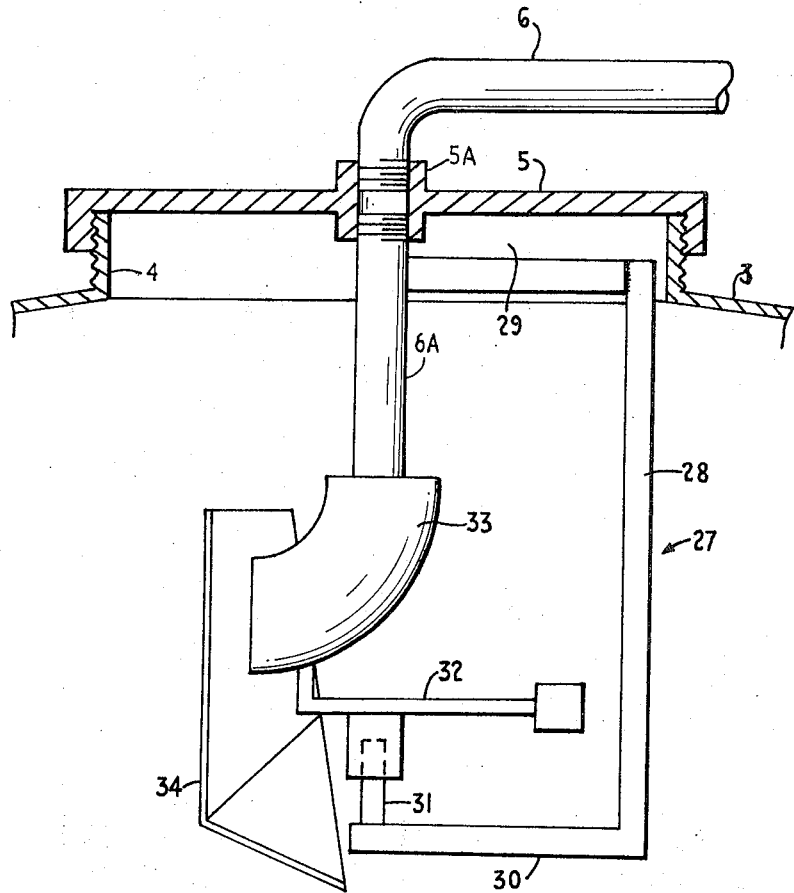
Figure 4:
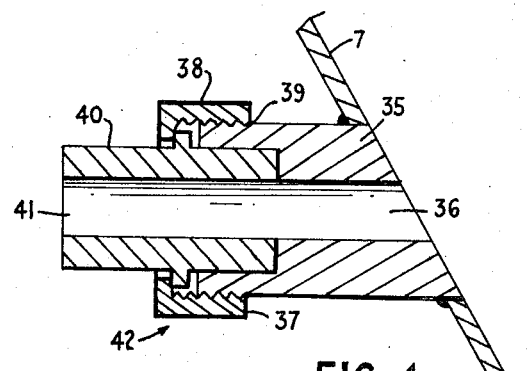
Figure 5:
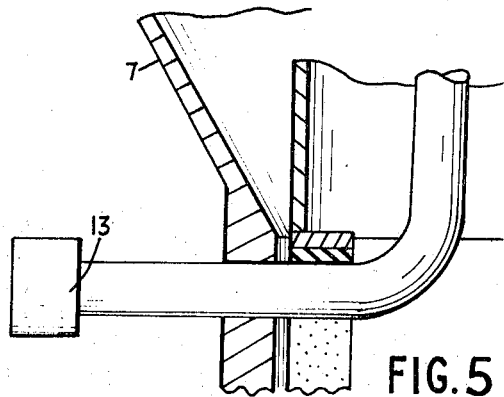

Nothwithstanding any other forms that may fall within its scope, one particular embodiment of the invention will hereinafter be described with reference to the accompanying drawings in which:

FIG. 1 is a sectional elevation of a vessel according to the invention,

FIG. 2 is a sectional elevation of the bottom portion of the vessel of FIG. 1 showing the principal components of the door, FIG. 3 is a part sectional elevation of a rotary sprinkler according to the invention, FIG. 4 is a sectional view of a portion of the vessel of FIG. 1 showing the structural features of a jet, FIG. 5 is a sectional view of another portion of the vessel of FIG. 1 showing the structural features of a riser tube and draining port, and FIG. 6 is a part sectional elevation of a screen adapted for use in the vessel of FIG. 1.

Referring first to FIG. 1, the apparatus comprises a large vessel 1 having a cylindrical upright wall 2. The upper end of the vessel has a roof 3 having an orifice 4 at its center. The orifice 4 is closed off by a door 5 which has an internally threaded boss 5A.

At the lower end of the wall 2 is an inverted cone shaped portion 7, the apex of which has a large orifice 8 and a door 9.

Removably positioned co-axially within the vessel 1 is a tubular filter screen 10 which is formed of a suitable perforated material, preferably stainless steel. At the upper end of the screen 10 is mounted a hook or loop 11 to facilitate removal of the screen 10. The portion of the cone shaped portion 7 adjacent the orifice 8 is tubular in form and has drain ports 12 and 13 which project into the orifice 8 and connect to drain tubes 14, 15 projecting upwards into the portion of the vessel enclosed by the screen 10. Mounted on the cone shaped portion 7 adjacent the wall 2 may be one or more fluid jets 42.

Referring to FIG. 2: Mounted on the tubular portion at the lower end of the wall 7 is a pivot mounting bracket 44 to which is attached a vertically disposed pivot 17. Mounted on the wall at a position diametrically opposite the bracket 17 is a clamping block 18. Positioned at a convenient position in the wall 7 is a racking or filling valve 16 (FIG. 1).

Pivotally mounted on the pivot 17 is a door clamping member 19A which is somewhat rectangular in plan. The free end of the member 19A has an upwardly and inwardly extending flange 20, which when the door is closed, engages the block 18. The member 19A and the block 18 are substantially smaller in width than the diameter of the bottom of the wall 7 thereby permitting the member 19A to pivot transversely of the vessel. At the center of the member 19A is a clamping screw 21 which is co-axial with the orifice 8. The upper end 22 of the screw 21 is pivotally secured in a socket 22A in a circular closure member 24A which is greater in diameter than the orifice 8. The clamping screw 21 is axially movable by virtue of its threaded portion 25 whereby the peripheral upper surface of a member 24 may be caused to engage a circumferential seal 26 attached to the rim of the orifice 8. Disposed in the closure member 24 is a drain valve 43 which may be any convenient type of valve available. The door 9 in one form comprises the flat circular disc shaped member 24 which acts as the closure. To prevent distortion of the member 24 under the influence of the screw 22 there is provided the dish shaped member 24A which is attached at its peripheral edge to the member 24. The member 24A is also provided with radial ribs 19 which interconnect with the cup portion or socket 22A adapted to receive the upper end of the screw 22.

Referring next to FIG. 3: The door 5 in the roof 3 has a threaded boss 5A adapted to receive an irrigator or sprinkler. The sprinkler comprises a support frame 27 having a vertical member 28 and upper and lower parallel horizontal members 29, 30 respectively. The upper member may be attached to the door 5 by any convenient means but preferably by way of a threaded conduit 6A received in the boss. The lower member 30 has an upwardly projecting shaft 31 which rotatably supports a horizontal member 32. Mounted on the member 32 is a deflector tube 33 and a deflector plate 34. The conduit 6A is adapted to direct fluid passing through it into the tube 33 which in turn deflects it onto the plate 34 thus causing the member 32 and plate and tube 34, 33 to rotate sprinkling the fluid about the vessel 1.

The fluid jets 42, FIG. 4, are mounted substantially horizontally through the wall 7 and each jet comprises a body 35 having a passage 36 through it from end to end. The outer end of the body 35 has a threaded portion 37 adapted to accept a connector nut 38. The outer end of 35 is counter-bored to accept one end 39 of the flanged connector 40 which also has a passage 41 through it from end to end. Where a plurality of these jets is fitted to the vessel there may be a ring or annular main supply conduit 42A (FIG. 1), connecting all the jets 42 to a common fluid supply source.

Referring now to FIG. 5, the drain valves 12 and 13 (FIG. 1) are similar in construction, the only difference being in that the drain tube 15 is longer than the tube 14. The valves 12, 13 which may be of any convenient type are fitted in the lower portion of the wall 7 of the vessel 1 (FIG. 1). The drain tube 15 extends upwardly into the portion of the vessel 1 enclosed by the screen 10 (FIG. 1) to a point above the junction of the walls 7 and 2 (FIG. 1). The drain tube 14 (FIG. 1) extends upwardly to a point below the junction of the walls 7, 2.

The screen 10 (FIG. 6) comprises a tubular body 45 having perforations 46 defining a filter screen. The body 45 is structurally strengthened with a plurality of axially spaced circumferential ribs 47.

The lower end of the body 45 is adapted to sealingly locate in the orifice 8 and includes slots 48 and seal rings 49 adapted to engage the drain tubes 14 and 15 where they pass through the wall 7 of the vessel 1 (FIG. 1).

The upper end of the screen 10 includes a plurality of slotted lugs 50 adapted to securely receive complementary lugs 51 on a cap 52. The cap 52 comprises an annular portion 53 adapted to be received by the upper end of the body 45 and is retained by the lugs 51 engaged with the slotted lugs 50. The cap 52 includes a tubular member 54 which projects upwardly to a position immediately below the sprinkler support frame 27 (FIG. 1) and to which the loop 11 is attached.

In use as a draining tank for white must, the upper door 5 is removed and the screen 10 is placed in position. Draining tubes 14 and 15 are fitted. Drain valves 12 and 13 and final drain 43 are closed.

Crushed grapes are pumped into the vessel through the orifice 4 or the filling point 16. After the expiration of the required period of time, draining is commenced through valve 13 and continued until the liquid level falls below the top level of tube 15. Draining is then commenced through drain valve 12, when flow ceases, the final draining is effected through valve 43 in bottom door 9. The bottom and upper doors are removed and the screen is raised allowing the drained skins to fall through the bottom orifice.

In use as a fermenting vessel, the screens are placed in position, the doors and valves are closed and crushed grapes and yeast are pumped in through upper orifice 4 or filling points 16. The upper door and sprinkler assembly (FIG. 3) are then installed. At selected times during fermentation, valve 16 is opened and juice is pumped via a cooling device to the sprinkler, which in turn sprays the juice over the skin cap. When fermentation has proceeded to a desired stage, the juice is drained off through all or any of valves 12, 13 and 43, the doors opened, the screen removed and the skins allowed to fall through the bottom orifice.

Should coagulation or caking of the skins occur which prevents the skins from falling through the bottom orifice, a suitable fluid is pumped through the jets 42 to cut the cake and allow emptying to continue.

To facilitate cleaning of the vessel and its use as a storage vat, the drain tubes, jets and screens are removable and the jets replaced by blank plugs of like dimensions.

To effect the removal of the drained skins from the vessel it is important that the angle of the wall 7 (FIG. 1) be between 135° and 150° from the vertical wall, preferably at an angle of 142° from the vertical wall.

What I claim is:

1. Wine making apparatus comprising a tank having a roof, a sidewall, a bottom wall converging downwards, an opening in the tank bottom, a door normally closing the opening and movable to an open position, at least one upper inlet to the tank, at least one inlet/outlet to and from the tank above the bottom opening, a tubular removable screen within the tank and disposed along the converging axis of the tank bottom with its lower end sealed against the bottom outlet, a first approximately upright drainage tube within the screen and open at its upper end and extending from the screen through the tank wall in liquid tight fashion and having a closure means on its outer end, a second approximately upright drainage tube within the screen and open at its upper end and extending from the screen through the tank wall in a liquid tight fashion and having a closure means on its outer end, the upper end of the first tube being above the upper end of the second tube, a third drainage tube from the bottom opening door and a closure means on the outer end of the third tube.

2. Apparatus as in claim 1 including also at least one jet through the tank wall for admitting liquid.

3. Apparatus as in claim 1 including also means for sprinkling liquid into the tank from at least one upper inlet.

4. Apparatus as in claim 1 wherein the floor converges at an angle of between 135° and 150° to the sidewall.

5. Apparatus as in claim 1 wherein the floor converges at an angle of 142° to the sidewall.

6. Wine making apparatus comprising a vessel having at least one sidewall, a roof, means for the admission of raw materials into the vessel, a downwardly convergent floor, product outlet means, separate means at the convergent portion of said floor for the removal of a residual material and further separate screen means in said vessel for preventing the clogging of said product outlet means by said residual material.

7. Apparatus as claimed in claim 6 wherein said screen means includes a screen member which upstands in said vessel from a position proximate the means for removal of residual material.

8. Apparatus as claimed in claim 7 wherein said means for the removal of residual material comprises a door attached to said vessel for movement between an open position in which residual material can be removed and a closed position, said product outlet means including means carried by said door for removal of product with the door closed.

9. Apparatus as claimed in claim 7 wherein said product outlet means comprises a drain tube extending within said screen member and having an outlet externally of the vessel.

10. Apparatus as claimed in claim 7 wherein the floor converges at an angle of between 135° and 150° with respect to the sidewall.

11. Wine making apparatus comprising a vessel having at least one sidewall, a roof, a bottom wall converging downwardly to terminate at an opening in the bottom of said vessel, a door normally closing said opening and movable to an open position, at least one upper inlet to said vessel, a tubular removable screen within the vessel and disposed along the axis of the converging bottom wall of said vessel, said screen having a lower end engaging said bottom wall at said opening, and at least one drainage outlet disposed in the bottom of said vessel and communicating internally of said screen.

12. Apparatus as in claim 11 wherein the floor converges at an angle of between 135° and 150° to the sidewall.

13. Apparatus as claimed in claim 11 wherein said drainage outlet includes means carried by said door for removal of product with the door closed.

14. Apparatus as claimed in claim 11 wherein said drainage outlet comprises a drain tube extending within said screen and having an outlet externally of the vessel.

* * * * *